No. 724,929. PATENTED APR. 7, 1903.
H. C. OSBORN.
METHOD OF ENGRAVING.
APPLICATION FILED DEC. 23, 1901.
NO MODEL.
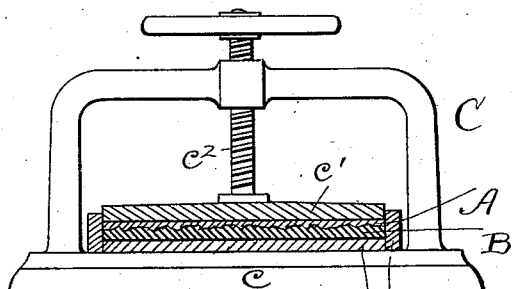
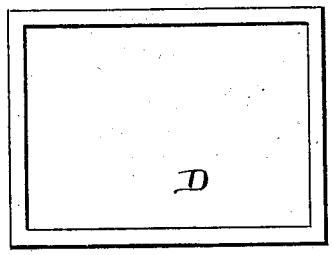
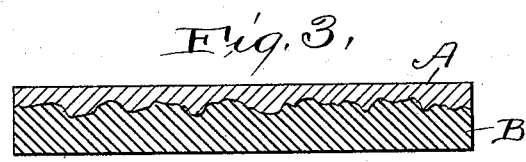
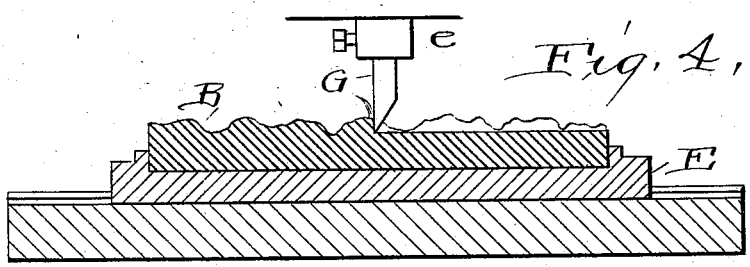
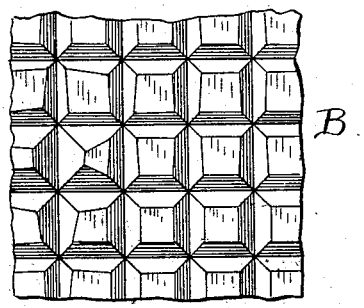
Witnesses.
E. B. Gilchrist
H. M. Wise
Inventor,
Henry C. Osborn
By his Attorneys,
Thurston & Bates.

UNITED STATES PATENT OFFICE.

HENRY C. OSBORN, OF CLEVELAND, OHIO.

METHOD OF ENGRAVING.

SPECIFICATION forming part of Letters Patent No. 724,929, dated April 7, 1903.

Application filed December 23, 1901. Serial No. 86,879. (No model.)

*To all whom it may concern:*

Be it known that I, HENRY C. OSBORN, a citizen of the United States, residing at Cleveland, in the county of Cuyahoga and State of Ohio, have invented a certain new and useful Improvement in Methods of Engraving, of which the following is a full, clear, and exact description, reference being had to the accompanying drawings.

The invention relates to the art of reproducing pictured representations of any subject, the object of the invention being to cheaply and quickly produce a printing-surface representing the subject and especially adapted to be printed from in an ordinary printing-press.

The latter part of the foregoing statement is not intended as a limitation upon the use of the product of the process, but rather as a designation of the field in which it is believed the invention will be most useful.

The invention consists in the process hereinafter described of producing such printing-surface.

In carrying out the invention in the best and most practical manner a relief representation of the subject is first prepared, by which is meant a representation wherein the lights and shades of the picture correspond with and are proportionate to the depressions and elevations in the surface on which the picture appears. In case the plate which is the ultimate product of the process is to be used in an ordinary printing-press this relief representation should be a positive; but if the plate is to be used as the means for transferring the subject to a lithographer's plate or stone or for an analogous purpose the original relief representation should be a negative. Preferably a photogelatin print is the form of positive relief representation employed, because it may be produced quickly and cheaply and has the necessary characteristics above pointed out. This original relief representation may, however, be prepared in any other suitable manner. This relief representation is then placed face downward upon the surface of suitable impression-receiving material, preferably a plate of lead, and by the application of suitable pressure a counterpart relief representation is made in the surface of this material. Instead of lead any other material may be used if it is sufficiently plastic to take the impression and has the other qualities which adapt it to be treated and used as hereinafter described. The original relief representation has, as before stated, this characteristic, to wit: that the darker the surface is at any point the greater is its elevation above what may be termed the "base plane." In this counterpart representation the reverse condition exists—that is to say, the lighter the surface of the original at any point the greater are the elevations of the corresponding surface of the counterpart representation above what may be termed the "base plane" thereof. The uneven surface of this counterpart relief representation is the surface from which, after it is broken up by suitable grooves, the pictures may be printed. While its surface is uneven, as stated, the difference between the heights and depths thereof is so small that they do not incapacitate the plate for use in a press having a soft platen, and in a press having a hard platen this unevenness may be compensated for by securing the original representation to the platen so as to register with the counterpart when the impression is being made therefrom. To transform this counterpart representation into a printing-plate, the uneven surface thereof must be broken up, and with that end in view it is grooved by means of a graver having diverging sides, substantially as shown, which graver moves relatively to the surface it is engraving in a definite plane parallel with the base plane above referred to and at such distance therefrom, preferably, that the point of the graver cuts very shallow grooves in the very deepest part of the depressed surface. The bottoms of all the grooves are therefore in substantially the same plane. It does not matter, of course, whether the tool moves or the plate moves during this engraving or grooving operation. As an illustration merely of the mechanism which may be used for grooving the said plate the drawings show the reciprocating bed of a planer-like machine on which the counterpart plate may be secured by appropriate means and a fixed tool-holder for holding the engraving-tool. After each groove is cut there must be a relative movement laterally of the plate and tool a distance equal to the desired distance between two contiguous grooves, the distance of which movement will depend upon conditions and circumstances well understood in the art. If a cross-line effect is desired, similar cross-grooves may be cut in the uneven surface of the plate. It is obvious that when the counterpart relief-surface is broken up, as described, the higher the surface at any point the deeper, and consequently the wider, will be the grooves therein made by the tool. In the parts of this counterpart relief representation in which the widest grooves are cut less of the original surface will remain. In other words, the width of the grooves made by the graver will be proportionate to the elevation of the surface engraved and the parts of the original surface left between the grooves from which the reproducing impressions will be printed will be inversely proportionate. When it is remembered that the parts of the counterpart surface are deeper as the corresponding parts of the original relief representation is darker in shade, it will be seen that on those parts of the engraved surface corresponding with the light parts of the original representation the printing-surfaces left between the grooves are relatively small and far apart and that on the parts of the engraved surface corresponding with the black or dark parts of the original representation the grooves are proportionately narrow and the remaining printed surface proportionately larger and nearer together. As before stated, this product of the process is best adapted for use in an ordinary printing-press, in which case the impressions are made by the parts of the original surface left standing; but it may be used as a transfer-plate, and perhaps generally as an engraved plate if a suitable press be devised, in which case the impression is made by the ink in the grooves. Where intended to be used in the manner last referred to, the original relief representation should be a negative.

Referring by letters to the parts shown in the drawings, A represents a sheet, preferably of celluloid, on which the original relief representation of the subject is made, the same being preferably a photogelatin print.

B represents a plate, preferably made of lead or some of the softer forms of type-metal, in which the counterpart relief representation is impressed and which after its surface is broken up is adapted to be printed from.

C represents a press by means of which the necessary pressure may be applied to impress the relief-surface of sheet A into the surface of the plate B, and thereby to produce the negative counterpart thereof. In this press, $c$ represents the bed, $c'$ a movable pressure-plate, and $c^2$ an actuating-screw. It will be understood that this press is intended to be simply illustrative of mechanism performing one step in the process and that any other mechanism capable of applying suitable pressure may be employed in its stead.

D represents a metal frame to which the impression-receiving plate B is fitted, its function being to prevent lateral spreading of the plate when the impression is being made therein. This is a desirable adjunct to the apparatus when the impression-receiving plate is made of lead. If the impression-plate, however, were made of less ductile material than lead, this frame would not be necessary, and, in fact, is not an absolute necessity even when lead is used.

E represents the reciprocating bed of a planer-like machine, and $e$ a fixed tool-support. This mechanism also is merely illustrative of mechanism adapted for employment in the process, and any other mechanism capable of grooving the plate as described may be used in its stead.

G represents the engraving-tool, which, as shown, has a V-shaped point. Just what shape specifically the engraving-tool used shall have is not material for the invention—that is to say, it is not material whether it shall have a sharp point and equally-diverging sides or a sharp point and unequally-diverging sides, or whether, having diverging sides, its end shall be an actual point or a small flat or round surface.

In the drawings, Figure 1 is a front elevation, partly in section, of a press in the act of pressing together the sheet A and plate B. Fig. 2 is a plan view of the metal frame D. Fig. 3 is a vertical sectional view, greatly magnified, of the sheet A and the lead plate B when the two are being pressed together. Fig. 4 is a vertical sectional view, greatly magnified, of a portion of the plate B and of a mechanism by which the same may be engraved. Fig. 5 is a plan view, greatly magnified, of a portion of the printing-surface of plate B produced as herein described. Fig. 6 is a front view of the end of a graver adapted for use in engraving or grooving the plate B.

Engraved plates produced by the process hereinbefore described are, as stated, intended primarily to be used to print from. Such plates may, however, be used in the transmitting-machine of an apparatus for transmitting pictures telegraphically between distant points.

Having described my invention, I claim—

1. The process of producing an engraved plate having a surface from which pictured reproductions of a given subject may be printed, which consists in producing a relief representation of the subject on a plate capable of being used, as described, and in breaking up the uneven surface of said relief representation by a plurality of closely-placed grooves, having diverging sides, the bottoms of which grooves are in substantially the same plane.

2. The process of producing an engraved plate having a surface from which pictured reproductions of a given subject may be printed, which consists in first, producing a relief representation of the subject, second in impressing this relief representation into suitable impression-receiving material, thereby producing a counterpart relief representation of the subject, and third in forming in the uneven surface of this counterpart representation, a plurality of closely-placed V-shaped grooves whose bottoms are in substantially the same plane, substantially as specified.

3. The process of producing an engraved plate having a surface from which pictured reproductions of a given subject may be printed, which consists in producing a relief representation of the subject, in impressing this relief representation into suitable impression-receiving material, thereby producing a counterpart relief representation of the subject, and in breaking up the uneven surface of this counterpart representation by means of a plurality of closely-placed grooves whose width at the surface is proportionate to the elevation of the surface above a base plane, substantially as specified.

In testimony whereof I hereunto affix my signature in the presence of two witnesses.

HENRY C. OSBORN.

Witnesses:
E. L. THURSTON,
ALBERT H. BATES.